US008112667B2

(12) United States Patent
Belluomini et al.

(10) Patent No.: US 8,112,667 B2
(45) Date of Patent: Feb. 7, 2012

(54) AUTOMATED SYSTEM PROBLEM DIAGNOSING

(75) Inventors: Wendy Ann Belluomini, San Jose, CA (US); Binny Sher Gill, Shrewsbury, MA (US); Xifeng Yan, Santa Barbara, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/693,373

(22) Filed: Jan. 25, 2010

(65) Prior Publication Data

US 2011/0185233 A1 Jul. 28, 2011

(51) Int. Cl.
*G06F 11/00* (2006.01)

(52) U.S. Cl. ............ 714/27; 714/37; 707/603; 707/758

(58) Field of Classification Search ............... 714/27, 714/37; 707/603, 758
See application file for complete search history.

(56) References Cited

U.S. PATENT DOCUMENTS

| | | | |
|---|---|---|---|
| 4,635,214 A | | 1/1987 | Kasai et al. |
| 5,255,208 A | | 10/1993 | Thakore et al. |
| 5,422,640 A | | 6/1995 | Haley |
| 5,463,768 A | * | 10/1995 | Cuddihy et al. ............... 714/37 |
| 5,634,039 A | * | 5/1997 | Simon et al. ................. 703/18 |
| 5,675,727 A | * | 10/1997 | Watanabe ..................... 714/20 |
| 5,742,811 A | * | 4/1998 | Agrawal et al. ................ 1/1 |
| 5,922,079 A | | 7/1999 | Booth et al. |
| 6,185,560 B1 | * | 2/2001 | Young et al. .................. 707/776 |
| 6,415,395 B1 | | 7/2002 | Varma et al. |
| 6,662,089 B2 | | 12/2003 | Felke et al. |
| 7,152,242 B2 | * | 12/2006 | Douglas ......................... 726/23 |

(Continued)

FOREIGN PATENT DOCUMENTS

JP 03054635 A 3/1991
(Continued)

OTHER PUBLICATIONS

Agarwal, M.K. et al., "Problem Determination in Enterprise Middleware Systems using Change Point Correlation of Time Series Data", Network Operations and Management Symposium, pp. 471-482, 2006.

(Continued)

*Primary Examiner* — Scott Baderman
*Assistant Examiner* — Loan L. T. Truong
(74) *Attorney, Agent, or Firm* — Mohammed Kashef

(57) ABSTRACT

Embodiments of the invention relate to automated system problem diagnosing. An index is created with problem description information of previously diagnosed problems, a diagnosis for each problem, and a solution to each diagnosis. System states, traces and logs are extracted from a source system with a new problem. The problem diagnosis system generates problem description information of the new problem from the system states, traces and logs. Problem description information of the new problem is compared with problem description information in the problem description index. A search score is computed for each document in the problem description index. The search score is a measure of similarity between each document in the index and the description of the new problem. A matching score is assigned to each previously diagnosed problems based on the search score. The matching score is a measure of similarity between the new problem and each previously diagnosed problem. The system determines a diagnosis and solution of the new problem based on a diagnosis and solution of one of the previously diagnosed problems.

30 Claims, 5 Drawing Sheets

U.S. PATENT DOCUMENTS

| | | | |
|---|---|---|---|
| 7,206,771 B2 | 4/2007 | Alvarez et al. | |
| 7,653,633 B2* | 1/2010 | Villella et al. | 707/648 |
| 7,809,681 B2* | 10/2010 | Nakamura | 707/610 |
| 7,836,341 B1* | 11/2010 | Krishnan | 714/26 |
| 7,844,873 B2* | 11/2010 | Funatsu | 714/741 |
| 2003/0061857 A1* | 4/2003 | Keller | 73/1.01 |
| 2004/0122823 A1* | 6/2004 | Baffes et al. | 707/100 |
| 2004/0194114 A1* | 9/2004 | Spiegel | 719/318 |
| 2006/0161816 A1* | 7/2006 | Gula et al. | 714/39 |
| 2006/0184529 A1* | 8/2006 | Berg et al. | 707/8 |
| 2007/0038911 A1* | 2/2007 | Koenemann et al. | 714/732 |
| 2007/0286531 A1* | 12/2007 | Fu et al. | 382/305 |
| 2008/0114727 A1* | 5/2008 | Lee et al. | 707/3 |
| 2008/0256404 A1* | 10/2008 | Funatsu | 714/724 |
| 2008/0313118 A1 | 12/2008 | Anerousis et al. | |
| 2009/0177936 A1* | 7/2009 | Koenemann et al. | 714/737 |
| 2009/0217101 A1* | 8/2009 | Becker | 714/39 |
| 2010/0131800 A1* | 5/2010 | Fujimaki et al. | 714/37 |
| 2010/0251210 A1* | 9/2010 | Amaral et al. | 717/105 |

FOREIGN PATENT DOCUMENTS

| | | |
|---|---|---|
| JP | 04033024 A | 2/1992 |
| JP | 2001014187 A | 1/2001 |

OTHER PUBLICATIONS

Agrawal, R. et al., "Fast Algorithms for Mining Association Rules", Proc. 20th Int. Conf. Very Large Data Bases, VLDB, vol. 1215, p. 487499, 1994.

Aguilera, M.K. et al., "Performance Debugging for Distributed Systems of Black Boxes", Proc. of the Nineteenth ACM Symposium on Operating Systems Principles, pp. 74-89, ACM New York, NY, USA, 2003.

Arlitt, M.F. et al., "Internet Web Servers: Workload Characterization and Performance Implications", IEEE/ACM Transactions on Networking, 5(5):631-645, 1997.

Banga, G., "Auto-Diagnosis of Field Problems in an Appliance Operating System", Proceedings of 2000 USENIX Annual Technical Conference, San Diego, California, Jun. 18-23, 2000, p. 24.

Barham, P. et al., "Magpie: online modelling and performance-aware systems", Proceedings of HotOS IX: The 9th Workshop on Hot Topics in Operating Systems, Lihue, Hawaii, May 2003, pp. 85-90.

Brin, S. et al., "The Anatomy of a Large-Scale Hypertextual Web Search Engine", Computer Networks and ISDN Systems, 30(1-7):107-117, 1998.

Cohen, I. et al., "Capturing, indexing, clustering, and retrieving system history", ACM SIGOPS Operating Systems Review, 39(5):105-118, 2005.

Duan, S. et al., "Guided Problem Diagnosis through Active Learning", International Conference on Autonomic Computing, 2008. ICAC '08, pp. 45-54, Jun. 2008.

Dufayard, J., et al., "Tree pattern matching in phylogenetic trees: automatic search for orthologs or paralogs in homologous gene sequence databases", Bioinformatics, 21(11):2596-2603, 2005.

Grahne, G. et al., "Fast Algorithms for Frequent Itemset Mining Using FP-Trees", IEEE Transactions on Knowledge and Data Engineering, pp. 1347-1362, 2005.

Han, J. et al., "Mining Frequent Patterns without Candidate Generation: A Frequent-Pattern Tree Approach", Data Mining and Knowledge Discovery, 8(1):53-87, 2004.

Hatcher, E. et al., "Lucene in Action", Action series, Manning Publications Co., Greenwich, CT, 2004.

Huang, H. et al., "PDA: A Tool for Automated Problem Determination", Proceedings of the 21st Large Installation System Administration Conference (LISA '07), USENIX Association, Nov. 2007, pp. 153-166.

Iyer, R. et al., "Automatic Recognition of Intermittent Failures: An Experimental Study of Field Data", IEEE Transactions on Computers, vol. 39, No. 4, Apr. 1990, pp. 525-537.

Jiang, W. et al., "Understanding Customer Problem Troubleshooting from Storage System Logs", Proceedings of the 7th USENIX Conference on File and Storage Technologies, 2009, pp. 43-56.

Jing, L. et al., "Improved feature selection approach TFIDF in text mining", Proceedings of 2002 International Conference on Machine Learning and Cybernetics, vol. 2, Nov. 2002, pp. 944-946.

Lin, T. et al., "Error log analysis: statistical modeling and heuristic trendanalysis", IEEE Transactions on Reliability, vol. 39, No. 4, Oct. 1990, pp. 419-432.

Parthasarathy, S. et al., "Incremental and Interactive Sequence Mining", Proceedings of the eighth international conference on Information and Knowledge Management, pp. 251-258, ACM Press New York, NY, USA, 1999.

Prestridge, D., (1991) "Signal Scan: A computer program that scans DNA sequences for eukaryotic transcriptional elements", CABIOS 7, 203-206.

Redstone, J. et al., "Using Computers to Diagnose Computer Problems", Proceedings of HotOS IX: The 9th Workshop on Hot Topics in Operating Systems, Lihue, Hawaii, May 2003, pp. 91-96.

Tucek, J. et al., "Triage: Diagnosing Production Run Failures at the User's Site", Proceedings of Twenty-first ACM SIGOPS Symposium on Operating Systems Principles, pp. 131-144, ACM Press New York, NY, USA, 2007.

Yeh, J. et al., "A web-based three-dimensional protein retrieval system by matching visual similarity", Bioinformatics, vol. 21, No. 13, 2005, pp. 3056-3056, Oxford University Press.

\* cited by examiner

AUTOMATED SYSTEM PROBLEM DIAGNOSING

BACKGROUND

1. Field of the Invention

Embodiments of the disclosure relate to the field of system problem diagnosis, and in particular, systems and methods for automatically diagnosing a system problem.

2. Background of the Invention

A system may encounter a problem which needs to be diagnosed. System problems may include a software or application error, flaw, mistake, failure, or fault that prevents the software from operating as intended by producing an incorrect or unexpected result. System problems may further include a firmware error such as a memory leak or a firmware bug. System problems may further include an operating system configuration error such as an adapter port configuration problem or a Logical Unit Number (LUN) configuration problem. System problems further includes a hardware error such as a power supply failure, a fan failure, a controller failure, or a storage failure. System problems may further include a maintenance problem such as an adapter card failure during hardware replacement, power failure during adding hardware, or an internal power communication error during Remote Power Control (RPC) replacement. System problems may further include a network problem such as a Transmission Control Protocol and Internet Protocol (TCP/IP) configuration error, a TCP/IP connectivity error, a gateway error, or Domain Name System (DNS) error.

System problem diagnosis generally involves analyzing information to determine the cause of a status change from a satisfactory system state to an unsatisfactory system state. For example, a computer may be running as expected, but may subsequently have a problem which causes the system to not operate as anticipated. Problem diagnosis involves an ability to detect a problem to yield information useful for diagnosing the problem. Problem diagnosis is based on an ability to analyze information generated by a system or an application to determine a root-cause of the problem to determine an appropriate solution.

System problems may be diagnosed manually. Troubleshooting of systems may be done manually by technicians or engineers. For example, a user may troubleshoot the system to find a problem. The user may view system information, test hardware components, and manually run tests to determine and diagnose a system or an application problem. Systems typically record information related to events in logs, traces, and system states which are useful for problem diagnosis. A technician may manually examine event information recorded by various system components, applications, and system states when there is a system problem. Previously diagnosed problems may also require manual troubleshooting to determine and diagnose a system or an application problem.

BRIEF SUMMARY

Embodiments of the invention relate to automated system problem diagnosis. An aspect of the invention includes a method for automatically diagnosing a system problem. The method receives a problem description index and problem description information of a new problem. The problem description index includes problem description information of previously diagnosed problems.

The method compares problem description information of the new problem with problem description information in the problem description index. The method computes a search score for each document in the problem description index. The search score is a measure of similarity between each document in the problem description index and the problem description information of the new problem. The method assigns a matching score to each of the previously diagnosed problems based on the search score. The matching score is a measure of similarity between the new problem and each of the previously diagnosed problems. The method determines a diagnosis of the new problem. The diagnosis of the new problem is a diagnosis of at least one of the previously diagnosed problems.

Another aspect of the invention includes a computer program product for automatically diagnosing a system problem. The computer program product includes a computer readable storage medium having computer readable program code embodied therewith. The computer readable program code includes computer readable program code configured to receive a problem description index and problem description information of a new problem. The problem description index includes problem description information of previously diagnosed problems.

The computer readable program code includes computer readable program code configured to compare problem description information of the new problem with problem description information in the problem description index. The computer readable program code further includes computer readable program code configured to compute a search score for each document in the problem description index. The search score is a measure of similarity between each document in the problem description index and the problem description information of the new problem. The computer readable program code further includes computer readable program code configured to assign a matching score to each of the previously diagnosed problems based on the search score. The matching score is a measure of similarity between the new problem and each of the previously diagnosed problems. The computer readable program code further includes computer readable program code configured to determine a diagnosis of the new problem. The diagnosis of the new problem is a diagnosis of at least one of the previously diagnosed problems.

Another aspect of the invention includes a system for automatically diagnosing a system problem. The system includes an index module configured to create a problem description index and update the problem description index with the problem description information of a new problem and a diagnosis of the new problem. The problem description index includes problem description information of previously diagnosed problems. The system further includes an extraction module configured to extract problem description information of a new problem. The system further includes a receiving module coupled to the extraction module and the indexing module, and configured to receive the problem description index and problem description information of the new problem.

The system further includes a scoring module coupled to the receiving module and configured to compare problem description information of the new problem with problem description information in the problem description index. The scoring module is further configured to compute a search score for each document in the problem description index. The search score is a measure of similarity between each document in the problem description index and the problem description information of the new problem. The scoring module is further configured to assign a matching score to each of the previously diagnosed problems based on the search score. The matching score is a measure of similarity between the new problem and each of the previously diagnosed problems. The system further includes a diagnosis module coupled to the scoring module. The diagnosis module is configured to determine a diagnosis of the new problem. The diagnosis of the new problem is a diagnosis of at least one of the previously diagnosed problems. The diagnosis module is configured to determine a solution to the new problem from the diagnosis based on a solution of at least one of the previously diagnosed problems.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. For example, while the following description will be described in terms of system problem diagnosis processes, modules, and devices for clarity and to place the invention in context, it should be kept in mind that the teachings herein may have broad application to all types of systems, devices and applications.

The embodiments of the invention relate to automated system problem diagnosing. A problem diagnosis system includes an index created with problem description information of previously diagnosed problems, a diagnosis for each of the previously diagnosed problem, and may include a solution to each diagnosis. The problem diagnosis system extracts system states, traces and logs from a source system with a new problem. The problem diagnosis system generates problem description information of the new problem from the system states, traces and logs extracted from the source system.

Problem description information of the new problem is compared with problem description information in the problem description index. A search score is computed for each document in the problem description index. The search score is a measure of similarity between each document in the problem description index and the problem description information of the new problem. A matching score is assigned to each of the previously diagnosed problems based on the search score. The matching score is a measure of similarity between the new problem and each of the previously diagnosed problems. The problem diagnosis system determines a diagnosis and solution of the new problem based on a diagnosis and solution of one of the previously diagnosed problems.

Figure 1:
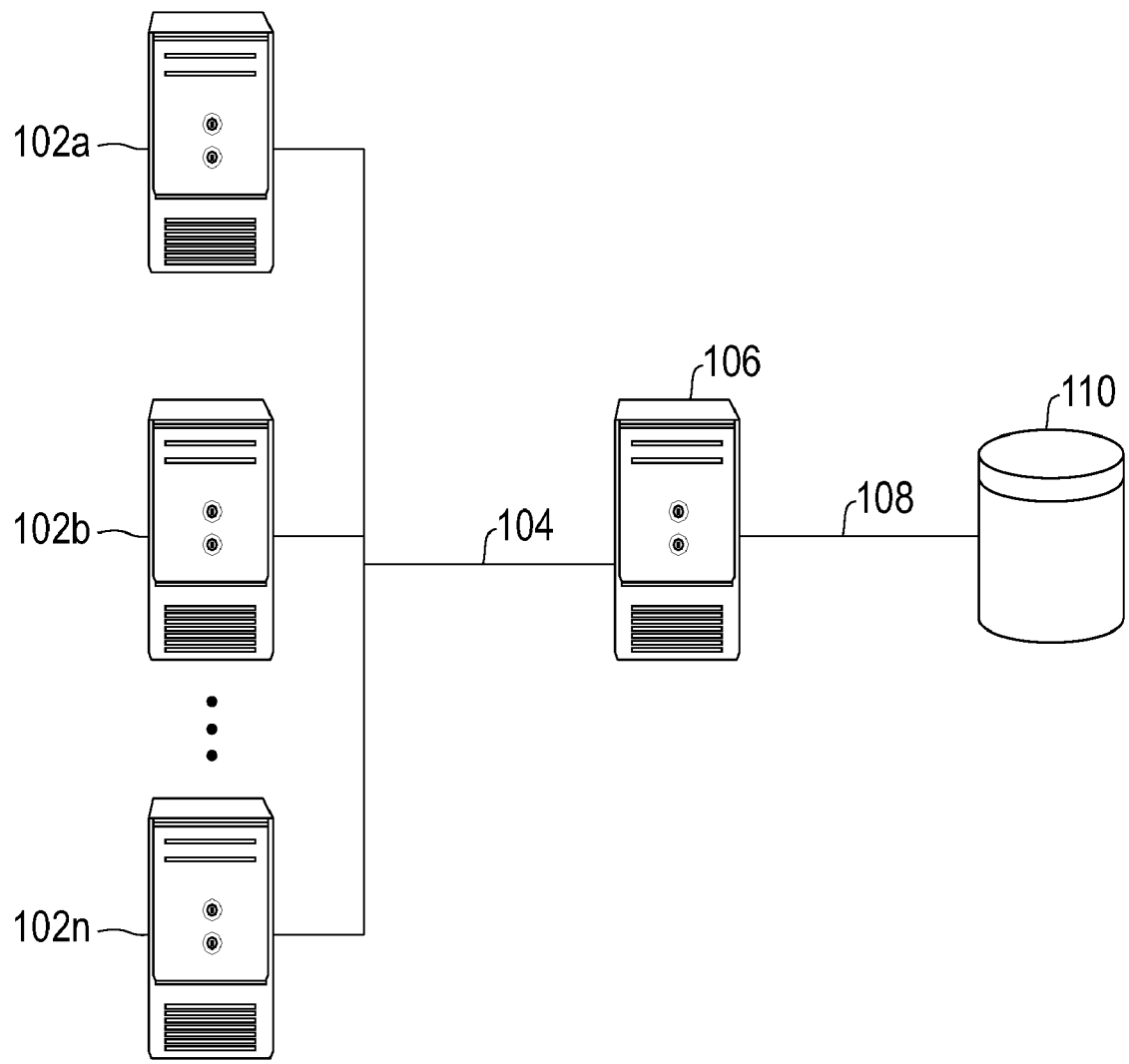
FIG. 1 illustrates system architecture for employing automated system problem diagnosis, according to one embodiment.

FIG. 1 illustrates system architecture for employing automated system problem diagnosis, according to one embodiment. The system architecture 100 includes a plurality of source systems nodes 102a, 102b, and 102n. The source systems nodes 102a, 102b, and 102n are coupled to problem diagnosis system node 106 over network connection 104. For example, network connection 104 includes, but is not limited to, a local area network (LAN) and a wide area network (WAN). The problem diagnosis system is embodied in software and may run from the problem diagnosis system node 106 or from any of the source system nodes 102a, 102b, and 102n.

The problem diagnosis system node 106 is coupled to storage subsystem 110 over connection 108, according to one embodiment. For example, storage subsystem 110 may include, but is not limited to, a locally attached physical storage, a network attached storage device (NAS), and a storage area network (SAN). For example, connection 108 may include, but is not limited to, a local area network (LAN), a wide area network (WAN), or a fibre channel (FC) network. The storage subsystem 110 includes a direct-attached storage (DAS) device, according to one embodiment. For example, problem diagnosis system node 106 is coupled to a DAS storage subsystem 110 using Small Computer System Interface (SCSI) connection 108.

Figure 2:
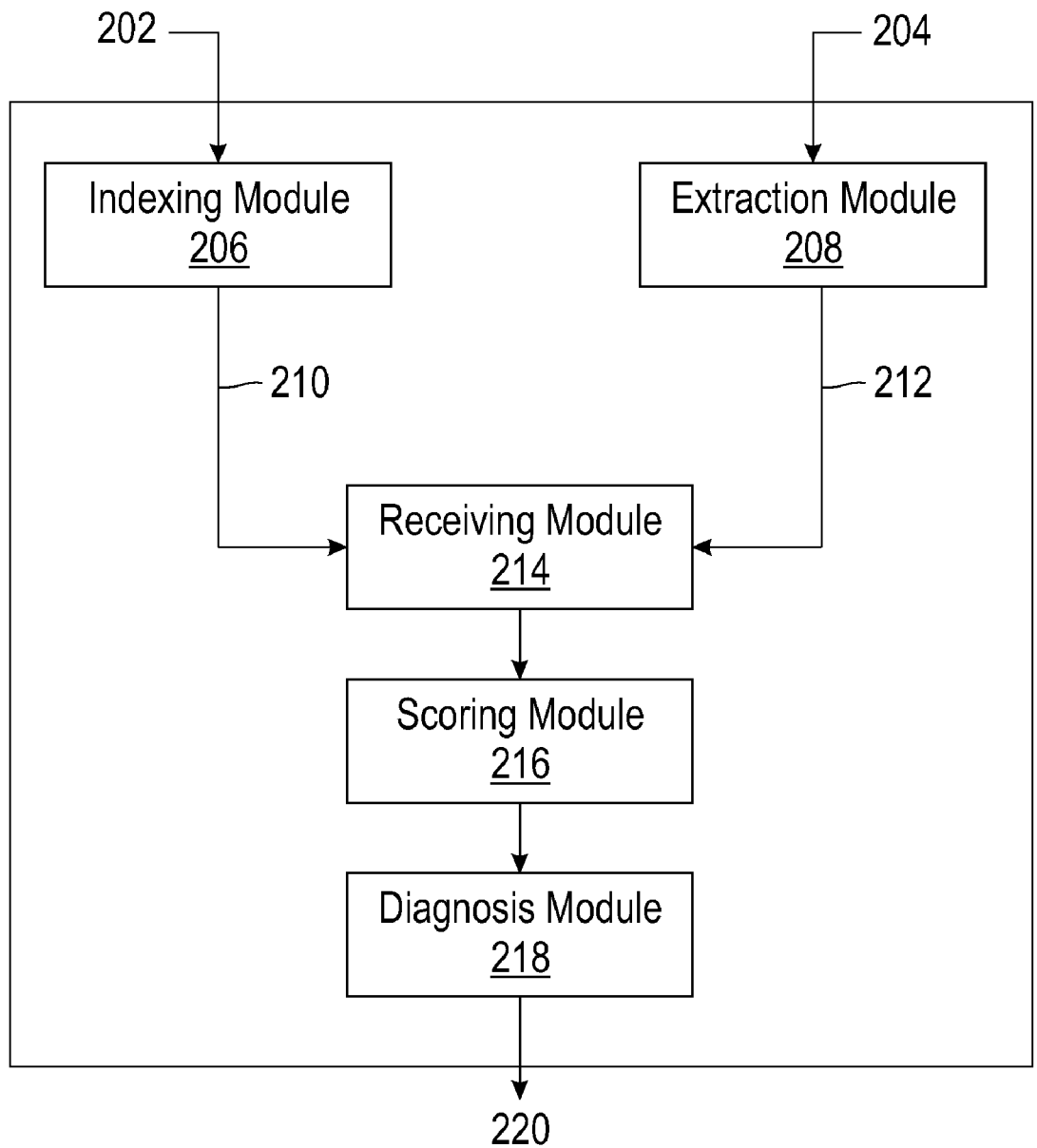
FIG. 2 illustrates software modules for automatically diagnosing a system problem, according to one embodiment.

FIG. 2 illustrates software modules 200 for automatically diagnosing a system problem, according to one embodiment. The software modules 200 include a plurality of software modules for performing the operations of automatically diagnosing a system problem. The software modules 200 include an indexing module 206. The input of the indexing module 206 is problem description information of previously diagnosed problems 202. The software modules 200 further includes an extraction module 208. The input of the extraction module 208 is system states, system traces, and system logs 204 from a source system with a new problem. The software modules 200 further includes receiving module 214. The indexing module 206 and the extraction module 208 are coupled to the receiving module 214. A scoring module 216 is coupled to the receiving module 214. A diagnosis module 218 is coupled to the scoring module 216. The diagnosis module outputs a problem diagnosis and solution of the new problem 220.

Figure 3:
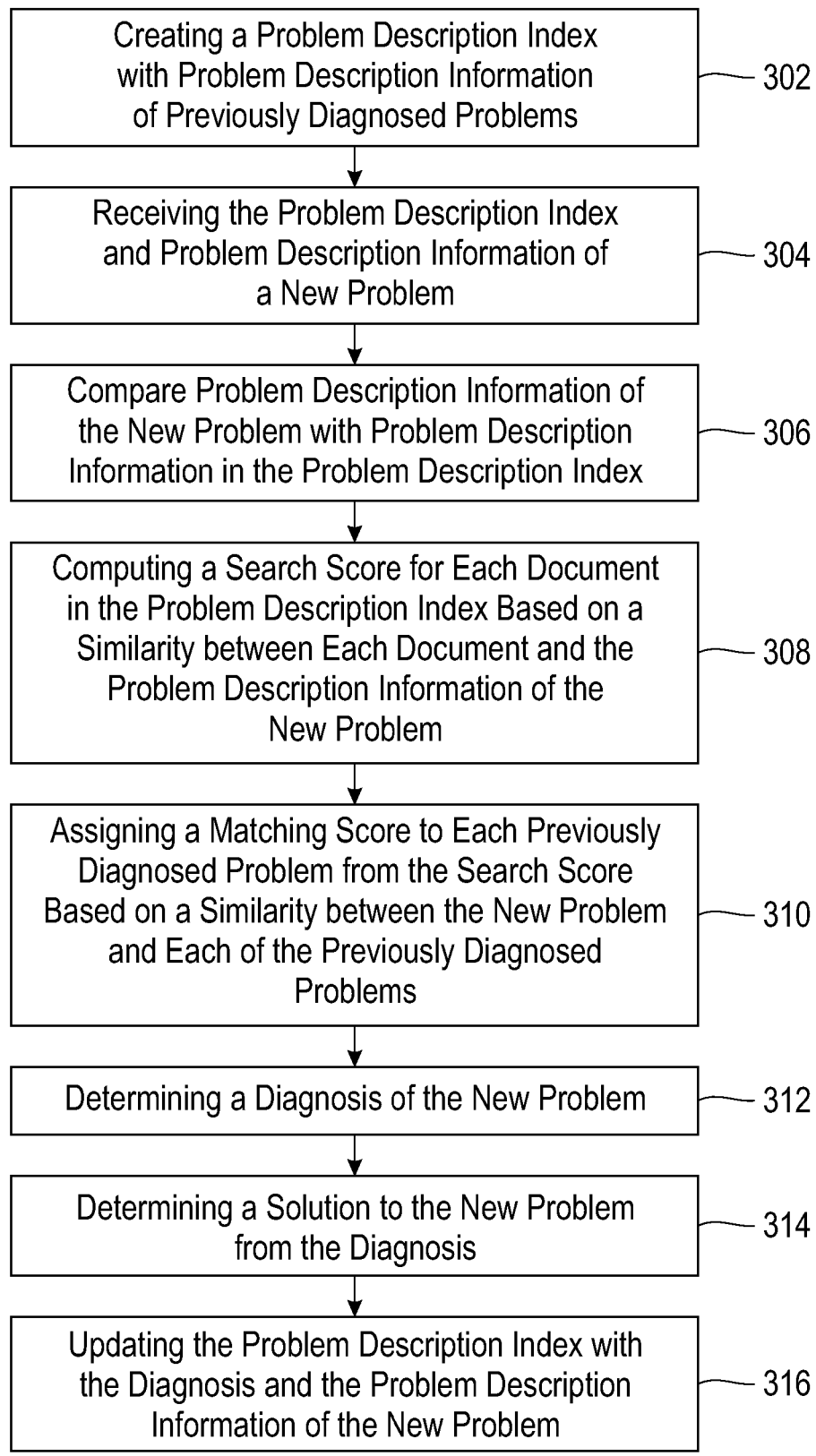
FIG. 3 illustrates a flow diagram of a method for automatically diagnosing a system problem, according to one embodiment.

FIG. 3 illustrates a flow diagram of a method 300 for automatically diagnosing a system problem, according to one embodiment. At 302, the indexing module 206 creates a problem description index. The problem description index 210 includes problem description information of previously diagnosed problems 202, a diagnosis of each of the previously diagnosed problems, and may include a solution to the diagnosis 202.

The problem description index 210 may be created using, but not limited to, Lucene™ library based functionalities, according to one embodiment (Lucene™ is a trademark of The Apache Software Foundation). A Lucene™ Application Programming Interface (API) may provide for scalable indexing under high performance workloads and easy extensibility. The Lucene library based functionalities further include field-based searching and sorting, multiple index sorting, and simultaneous updating and searching. The problem diagnosis system 106 is cross-platform versatile and able to handle different query types and sorting methodologies without code re-factoring using the Lucene™ library based functionalities.

The problem description index 210 may be created in various index structures. The problem description index 210 is created as a line-wise index, according to one embodiment. The line-wise index includes a document entry in the problem description information index for each line in the problem description information of previously diagnosed problems 202. The problem description index 210 is created as a description-wise index, according to one embodiment. The description-wise index includes a document entry in the problem description index 210 for the problem description information of previously diagnosed problems 202. The problem description index 210 is created as a set-wise index, according to one embodiment. The set-wise index includes a document entry in the problem description index 210 for problem description information of previously diagnosed problems 202.

At 304, the receiving module 208 receives problem description information of the new problem 212 and the problem description index 210. The receiving module 208 receives the problem description information from the previously diagnosed problems 202 from the problem description index 212 created by indexing module 206.

The problem description information of the new problem 212 is extracted by the extraction module 204 from system logs, system traces, and system states 204 associated with a new problem. The system logs, system traces, and system states 204 are recorded by the source system 102a, 102b, 102n with the new problem. The extraction module 208 extracts problem description information of the new problem 212 from system logs, system traces, and system states 204 when the new problem occurs on source system 102a, 102b, 102n. The extraction module 208 extracts the problem description information of the new problem 212 from system logs, system traces, and system states 204 by automatic extraction based on a tailored set of heuristic rules and domain knowledge, according to one embodiment. The problem description information of the new problem 212 is produced from the extracted information by the extraction module 208 by mining a correlation between recorded system logs, system traces, and system states 204, according to another embodiment.

The problem description information of the previously diagnosed problems 202 in the problem description index 210 and the problem description information of the new problem 212 may include event information which describes a problem. The problem description information may contain content from a plurality of system events in system logs, system traces, or system state 204. The content of the problem description information may include text describing a plurality of system events that have occurred. The problem description information may further include metadata which provides information about data managed within a system. The problem description information may further include a problem cause. The problem description information may further include a problem type. The problem description information may further include problem identification (ID). The problem description information may further include a problem set ID.

The problem diagnosis system 106 may operate without the extraction module 208, according to one embodiment. The problem description information of the new problem 212 is extracted by manual extraction by an administrator, according to one embodiment. A diagnosing administrator would extract problem description information of the new problem 212 and enter the problem description information of the new problem 104 into the problem diagnosis system 106 to identify a problem diagnosis based on the problem description information of previously diagnosed problems 202.

The problem diagnosis system 106 receives the problem description information from the problem description index 210 and the problem description information of the new problem 212. The receiving module 214 is configured to receive problem description index 210 from the indexing module 206 and problem description information of the new problem 212 from the extraction module 208.

At 306, the scoring module 216 compares problem description information of the new problem 212 with problem description information 202 in the problem description index 210. The scoring module 216 uses a plurality of fuzzy matching algorithms to compare problem description information of the new problem 212 with problem description information 202 in the problem description index 210. Contents of the problem description information of the new problem 212 will be searched in the problem description index 210.

Comparing problem description information may be based on different levels of granularity. The plurality of different index comparison granularity searches may include a line-wise search of the line-wise index. The plurality of different index comparison granularity may further include a description-wise search of the description-wise index. The plurality of different index comparison granularity may further include a description-wise search of the set-wise index.

In line-wise search of the line-wise index, each line in problem description information of a new problem 212, $l_n$, may be searched in the problem description index 210 using an inclusive OR function. The inclusive OR function is a Boolean operator which returns a value of 'True' if either or both of its operands is 'True.' For example, Query=$word_1 \| word_2 \| \ldots \| word_n$, wherein all words in each line in the problem description information of the new problem 212 are searched.

In line-wise search of the line-wise index, similarity of problem description information of a new problem 212 and a plurality of previously diagnosed problems in the problem description index 210 is defined as follows. A new problem is defined as p. A problem set is defined as s. All problem sets, as a whole, are defined as S. For example, a previously diagnosed problem, $p_i$, belonging to set, s, is defined as $p_i \in s$. A line including problem description information in a new problem 212, p, is represented as $l_n$. A line including problem description information in a previously diagnosed problem 202, $p_i$ is represented as $l_m$. A word or term in a line including problem description information is defined as w.

At 308, the scoring module 216 computes a search score for each document in the problem description index 210. The search score is a measure of similarity between each document in the problem description index 210 and the problem description information of the new problem 212. Similarity between a line, $l_n$, in the problem description information of a new problem 212 and a line in the problem description index 210, $l_m$, is obtained by normalizing the tf-idf score of each word, w, in a line, $l_m$, in the problem description index 210.

The tf-idf search is a standard feature selection technique for categorical data sets and is a statistical measure used to evaluate how important a word is to a document in a collection or corpus. Term frequency (tf) in a document is a measure of the importance of a term in a given document. Inverse document frequency (idf) is a measure of a general importance of a term. The tf-idf score increases proportionally based on the number of times a word appears in a document and is offset by the frequency of the word in a corpus.

The tf-idf score of each word, w, is normalized by taking the logarithm of the number of problem sets containing w plus 1, $|S_w|+1$, and then summing all normalized tf-idf scores of all words in the line, $l_n$, together. The search score for line-wise search of line-wise index is defined as:

$$Sim(l_n, l_m) = \sum_{w \in l_n} \frac{tfidf(w, l_m)}{\log(|S_w| + 1)}$$

The following algorithm can be used to calculate a tf-idf score:

$$tfidf(w, l_m) = \frac{n_{w,l_m}}{|l_m|} * \log\frac{N}{|D_w|}$$

wherein term frequency, represented by $$tf(w, l_m) = \frac{n_{w,l_m}}{|l_m|},$$

is the number of times that word w appears in a line, $l_m$, normalized, $n_w,l_m$, by the number of words in $l_m$, $|l_m|$. Inverse document frequency, is represented by $$idf(w) = \log\frac{N}{|D_w|},$$

where N is total number of log lines in historical problems and $D_w$ is the set of historical lines containing word w, is used to reduce the impact of common words that occur in a problem set. Higher frequency and lower document line frequency leads to higher scores.

In a line-wise search of the line-wise index, all terms in a line in the problem description index 210 are searched. For each line in the problem description information of a new problem 212, a search score is assigned to each document (a document is a log line in this line-wise index case) in the problem description index 210 in reference to a comparison with this new line. The documents (lines) in the problem description index 210 with the highest search scores (e.g. top 200 matching documents) are identified.

In a description-wise search of the description-wise index all terms in the problem description information of a new problem 212 are searched for in the problem description index 210. A search score is assigned to each document (the description of each previously diagnosed problem in description-wise index case) in the problem description index 210 in reference to a comparison with the description information of the new problem 104. The documents (e.g. top 200) in the problem description index 210 with the highest search scores are identified as top matching document.

In a description-wise search of a description-wise index The tf-idf score (tf-idf (w, $p_i$)) can be calculated as follows:

$$tfidf(w, p_i) = \frac{n_{w,p_i}}{|p_i|} * \log\frac{N}{|D_w|},$$

whereas term frequency $$tf(w, p_i) = \frac{n_{w,p_i}}{|p_i|}$$

is the number of times that word w appears in problem $p_i$, $n_{w,pi}$ normalized by the number of words in $p_i$, $|p_i|$. Inverse document frequency $$idf(w) = \log\frac{N}{|D_w|},$$

where N is total number of historical problems and $D_w$ is the set of historical problems containing word w.

The search score, or the similarity between a new problem p and an old problem $p_i$ is obtained by normalizing the tf-idf score of each word, w in $p_i$ by taking the logarithm of $|S_w|+1$, the number of problem sets containing w plus 1, and then summing all normalized tf-idf scores of all words in p together. The search scores are also the problem matching scores for a description-wise search of a description-wise index.

$$Sim(p, p_i) = \sum_{w \in p} \frac{tfidf(w, p_i)}{\log(|S_w| + 1)},$$

In a description-wise search of the set-wise index all terms in the problem description information of a new problem 212 in the problem description index 210 are searched. A search score is assigned to each document (a plurality of problem descriptions of a previously diagnosed problem set) in the problem description index 210 in reference to a comparison with this new problem description 212. The problem sets (e.g. top 10) in the problem description index 210 with the highest search scores are identified. The search scores are also the problem set matching scores. The problem sets in the problem description index 210 with the highest search scores are reported as a problem diagnosis.

In description-wise search of a set-wise index, the search score, or the problem set matching score, or the similarity between a new problem p and a problem set s, which may be defined as the sum of the tf-idf score of each word w in s:

$$Sim(p, s) = \sum_{w \in p} tfidf(w, s).$$

tf-idf (w, pi) can be calculated as follows:

$$tfidf(w, s) = \frac{n_{w,s}}{|s|} * \log\frac{N}{|D_w|},$$

whereas term frequency $$tf(w, s) = \frac{n_{w,s}}{|s|}$$

is the number of times that a word, w, appears in the problem set s, n" normalized by the number of words in s, |s|. Inverse document frequency is defined as $$idf(w) = \log\frac{N}{|D_w|},$$

where N is the total number of historical problem sets and $D_w$ is the historical problem sets word w.

At 310, the scoring module 216 assigns a matching score to each of the previously diagnosed problems based on the search score. A matching score is assigned to each previously diagnosed problem or problem set in reference to the compared new problem for each comparison. The matching score is a measure of similarity between problem description information of the new problem and problem description information of the compared previously diagnosed problem.

In a line-wise search of the line-wise index, after finding the matching documents (lines) in the problem description index 210 with the highest search scores for all lines in the new problem description, the search scores of all the matching documents are processed to generate the problem matching (similarity) scores or set matching (similarity) scores for the previously diagnosed problems, based on the similarity definition for line-wise search of a line-wise index. The previously diagnosed problems or problem sets with the highest problem matching scores or set matching scores (e.g., top 5 or 10 problems or sets) are reported as a problem diagnosis.

In a line-wise search of a line-wise index, similarity between problem description information of a new problem 212, p, and a plurality of previously diagnosed problems in the problem description index 210 included in a problem set, s, may be defined as:

$$Sim(p, s) = \sum_{p_i \in s} Sim(p, p_i)$$

$$Sim(p, p_i) = \sum_{l_n \in p} Sim(l_n, p_i)$$

$$Sim(l_n, p_i) = \max_{l_m \in p_i} Sim(l_n, l_m).$$

Sim(p,s) is the problem set matching (similarity) score between the new problem description and the descriptions of a plurality of previously diagnosed problems in the problem description index 210. Sim(p, $p_i$) is the problem matching (similarity) score between the new problem description 212 and the description of a previously diagnosed problem in the problem description index 210. Sim($l_n$, $p_i$) is the matching score between a line in the new problem description 212 and the description of a previously diagnosed problem in the problem description index 210.

For example, the search score for Query is the sum of the tf-idf score of each term, wherein Query=term$_1$||term$_2$|| . . . ||term$_n$. All terms from a line in the new description will be searched together in the previously diagnosed problem description information index by using an OR relation. The top M matching documents (problem description information lines) in problem description index 102 which have the highest tf-idf scores for the line query will be identified. After getting the top M matching problem description information lines for each line in the problem description information of the new problem 212, the search scores of all top matching problem description information lines may be further processed to generate the corresponding top N matching problems or sets based on the similarity definition. The top M matching problem description information lines may be large, for example top M=200. The top N matching problems or sets may be small, for example N=5.

In a description-wise search of the description-wise index the search scores of the top matching documents (e.g. top 200) with the highest search scores in the problem description index 210 are processed to generate the problem matching (similarity) scores or set matching (similarity) scores for the previously diagnosed problems. The problem matching scores or set matching scores are based on the similarity definition for description-wise search of a description-wise index. The previously diagnosed problems or problem sets with the highest problem matching scores or set matching scores (e.g., top 5 or 10 problems or sets) are reported as a problem diagnosis.

In a description-wise search of a description-wise index, the problem matching (similarity) score is the search score, which is defined previously. The problem set matching (similarity) score, or the similarity between a new problem p and a problem set s may be defined as:

$$Sim(p, s) = \sum_{p_i \in s} Sim(p, p_i)$$

In a description-wise search of a set-wise index, the problem set matching score is the search score, which is defined previously.

At 312, the diagnosis module 218 determines a diagnosis of the new problem from a diagnosis of at least one of the previously diagnosed problems in the problem description index 210 based on the assigned matching scores. The assigned matching scores are processed to determine a candidate diagnosis or a plurality of candidate diagnoses of the new problem. A user may update the problem description information of a new problem 212 and re-select a diagnosis of the new problem until appropriate problem description information is identified.

At 314, the diagnosis module 218 determines a solution to the new problem based on the corresponding diagnosis. The diagnosis module 218 determines a solution in reference to the selected candidate diagnose(s) in the problem description index 210.

At 316, the indexing module 206 updates the problem description index 210 with the diagnosis, solution and problem description information of the new problem when the new problem is resolved. The new problem becomes a historical problem after the new problem is resolved. A problem description of a new problem 212, including a problem cause and problem type is added into the problem description index 210 to assist with diagnosing similar problems in the future. The index module 206 allows problem description information in the problem description index 210 to be de-prioritized or removed if the diagnosed problem may not occur again. Problem description information may be removed, line-wise and description-wise, or updated, set-wise, from the index if the diagnosed problem may not occur again.

The indexing module 206 uses a Configuration Management Version Control (CMVC) software package or other software packages which document the diagnosis process of the previously diagnosed problems, according to an embodiment of the invention. The problem description index 210 is also updated using CMVC logs which include additional information including comments, problem descriptions from technicians, and administrative information, which may or may not be retained.

The problem description index 210 may further include unfiltered logs, including raw logs of historical problems. Filtered logs are logs which have been previously processed through a troubleshooting technician. Filtered logs are likely to have a higher signal to noise ratio than unfiltered logs. Once the administrator resolves the problem the administrator documents the original input and diagnosis result into a CMVC file describing that problem. The indexing module 206 incorporates the input logs and diagnosis result into the problem description index 210.

Figure 4:
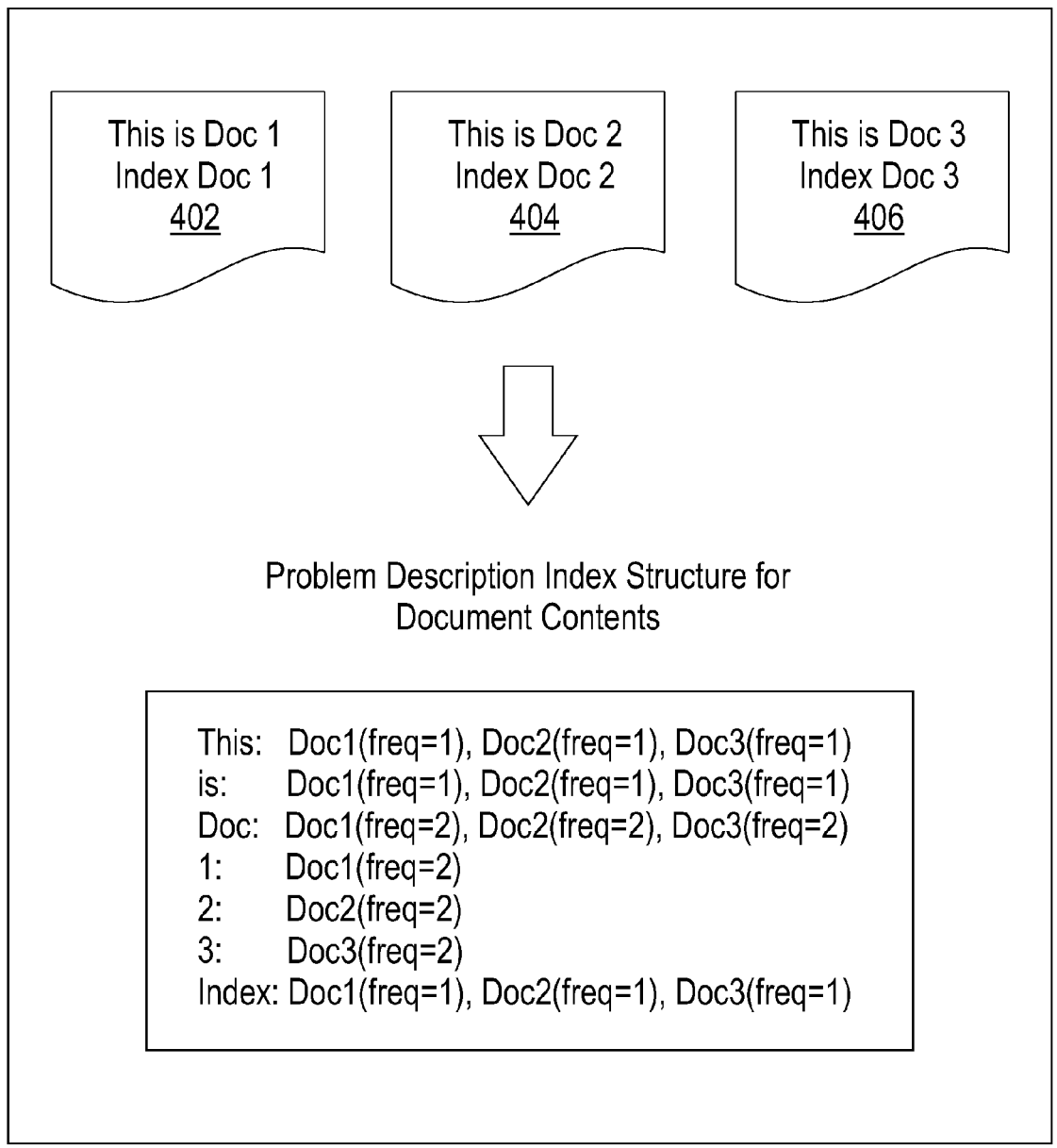
FIG. 4 illustrates a problem description index structure of documents with problem description information of previously diagnosed problems, according to one embodiment.

FIG. 4 illustrates a problem description index structure for document contents 400. The problem description index structure for document contents 500 illustrates three documents Doc 1 402, Doc 2 404 and Doc 3 406. Each word in a document is a single term. For example, each term in Doc 1 402, "This", "is", "Doc," "1," is a term. For each term, the problem description index 210 stores the documents containing the term and the term's occurring frequency in each document. For example, "Doc" appears twice in Doc 1 402, twice in Doc 2 404 and twice in Doc 3 406, therefore, the problem description index 210 has the entry Doc: Doc1 (freq=2), Doc2(freq=2), Doc3(freq=2). The problem description index 210 is used to generate the search results when a query or a search of the problem description index 210 is initiated. For example, search for term "Doc" will directly locate an entry in the problem description index 210 for "Doc" and return all the documents with the entry.

Diagnosis efficiency and accuracy is improved by processing the similarity for approximation and noise reduction. Approximations on problem set frequency, matching lines, and problem set similarity are made to the base similarity matching definition to reduce a problem set similarity matching calculation overhead, using a plurality of fuzzy matching algorithms. For noise reduction, raw log lines contain lots of noise, wherein the noise negatively impacts diagnosis accuracy.

In a line-wise search of a line-wise index, processing for approximation includes normalizing the tf-idf score of each term (word) in the problem description information of the new problem 212 based on the set frequency of the line containing this term in the in the problem description information of the new problem 212 also being located in problem description information of the plurality of previously diagnosed problems 202 in the problem description index 210.

$$Sim(l_n, l_m) = \frac{\sum_{w \in l_n} tfidf(w, l_m)}{\log(|S_{l_n}| + 1)}$$

In a line-wise search of a line-wise index, processing for approximation further includes for each line, $l_n$, in problem description information of the new problem 212, the approximated similarity only considers the top M matching problem description information lines with highest aggregated tfidf scores ($\Sigma_{w \in l_n} tfidf(w, l_m)$). Therefore:

$$Sim(l_n, p_i) = \max_{l_m \in p_i, l_m \in top\ M} Sim(l_n, l_m)$$

This is because a line $l_m$, in the problem description index 210 will be involved in the similarity calculation, if $l_n$, (a line in the new problem description) and $l_m$ share words. In another word, if $$\Sigma_{w \in l_n} tfidf(w, l_m) > 0.$$

Therefore, the number of matching index lines for each line, $l_n$, in the problem description information of the new problem 212, may be large because the amount of information indexed is large. This may cause large overhead in the similarity calculation.

Processing for approximation further includes the set similarity calculation only considers the top X (e.g. X=5) problems with highest problem similarities (Sim(p, $p_i$)), instead of calculating set similarity based on all problem similarities, in a line-wise search of a line-wise index.

$$Sim(p, s) = \sum_{p_i \in s, p_i \in top\ X} Sim(p, p_i)$$

In a line-wise search of a line-wise index, problem diagnosis efficiency and accuracy may be improved using a plurality of noise reduction techniques. Raw log lines contain lots of noise, wherein the noise negatively impacts diagnosis accuracy.

Processing for noise reduction, in a line-wise search of a line-wise index, further includes omitting a timestamp and a sequence number identifier from the problem description information of the previously diagnosed problems 202 in the problem description index 210 and from the problem description information of the new problem 212. The scoring module 216 ignores the temporal information between log lines because timestamp and sequence number information is irrelevant for classification.

Processing for noise reduction, in a line-wise search of a line-wise index, further includes removing duplicate problem description lines of problem description information of previously diagnosed problems 202 in the problem description index 210. Important and trivial lines in problem description information could be duplicated. Duplicate lines do not provide any further problem description information. The scoring module 216 is configured to retain a single instance of duplicated lines in problem description information.

In a line-wise search of a line-wise index, processing for noise reduction further includes normalizing the matching score (similarity) between a line in the problem description information of the new problem 212 and a description of a previously diagnosed problem on the number of similar lines in the new problem description to this line. Similar lines in the problem description information of the new problem 212 and the problem description index 210 which is trivial may skew a comparison away from more important problem description information. Therefore, Sim($l_n$, $p_i$) is normalized by |similarLines$l_n$|+1, the number of lines similar to $l_n$ plus 1.

Processing for noise reduction, in a line-wise search of a line-wise index, further includes filtering out the effect of irrelevant logs lines on problem or set similarity calculation by filtering out the low similarity score of Sim($l_n$, $p_i$). The scoring module 216 uses a score filter threshold $\partial$ on Sim($l_n$, $p_i$) for noise reduction.

In description-wise search of a description-wise index, approximations on problem set frequency, matching problems, and problem set similarity are made to the base similarity matching definition to reduce a problem set similarity matching calculation overhead, using a plurality of fuzzy matching algorithms.

Processing for approximation, in a description-wise search of a description-wise, index includes normalizing the tf-idf score of each term (word) in the problem description information of the new problem 212 based on the set frequency of the problem description information of the new problem 212 being located in problem description information of the plurality of previously diagnosed problems 202 in the problem description index 210.

$$Sim(p, p_i) = \frac{\sum_{w \in p} tfidf(w, p_i)}{\log(|S_p| + 1)}$$

Processing for approximation, in description-wise search of a description-wise index, further includes for the problem description information of the new problem 212, the approximated similarity only considers the top M matching documents (problem descriptions) in the problem description index 210 with highest aggregated tf-idf search scores ($\Sigma_{w \in p} tfidf(w,p_i)$). Therefore:

$$Sim(p, p_i) = \frac{\sum_{w \in p} tfidf(w, p_i)}{\log(|S_p| + 1)},$$

$$\text{if } \sum_{w \in p} tfidf(w, p_i) \in \text{top } M,$$

$$Sim(p, p_i) = 0, \text{ otherwise}$$

This is because a previously diagnosed problem $p_i$ in the problem description index 210 will be involved in the similarity calculation if the problem description information of the new problem 212, p, and the previously diagnosed problem 202, $p_i$, share words. For example, $$\Sigma_{w \in p} tfidf(w,p_i) > 0$$

Therefore, the number of matching problems for the problem description information of the new problem 212 may be large because the amount of information indexed is large. This may cause large overhead in the similarity calculation.

In description-wise search of a description-wise index, processing for approximation further includes the set similarity calculation only considers the top X (e.g. X=5) problems with highest problem similarities (Sim(p, $p_i$), instead of calculating set similarity based on all problem similarities.

$$Sim(p, s) = \sum_{p_i \in s, p_i \in top\ X} Sim(p, p_i)$$

In description-wise search of a description-wise index, problem diagnosis efficiency and accuracy may be improved using a plurality of noise reduction techniques. Raw log lines contain lots of noise, wherein the noise negatively impacts diagnosis accuracy.

Processing for noise reduction, in description-wise search of a description-wise index, includes omitting a timestamp and a sequence number identifier from the problem description information of the previously diagnosed problems 202 in the problem description index 210 and from the problem description information of the new problem 212, according to one embodiment. The scoring module 216 ignores the temporal information between log lines because timestamp and sequence number information is irrelevant for classification.

In description-wise search of a description-wise index, processing for noise reduction includes further includes removing duplicate problem description lines of the problem description information of previously diagnosed problems 202 in the problem description index 210, according to one embodiment. Important and trivial lines in problem description information could be duplicated. Duplicate lines do not provide any further problem description information. The scoring module 216 is configured to retain a single instance of duplicated lines in problem description information.

In a description-wise search of a set-wise index, problem diagnosis efficiency and accuracy may be improved using a plurality of noise reduction techniques. Raw log lines contain lots of noise, wherein the noise negatively impacts diagnosis accuracy.

Processing for noise reduction includes, in a description-wise search of a set-wise index, includes omitting a timestamp and a sequence number identifier from the problem description information of the previously diagnosed problems 202 in the problem description index 210 and from the problem description information of the new problem 212, according to one embodiment. The scoring module 216 ignores the temporal information between log lines because timestamp and sequence number information is irrelevant for classification.

Processing for noise reduction includes, in a description-wise search of a set-wise index, further includes removing duplicate problem description lines of the problem description information of previously diagnosed problems 202 in the problem description index 210, according to one embodiment. Important and trivial lines in problem description information could be duplicated. Duplicate lines do not provide any further problem description information. The scoring module 216 is configured to retain a single instance of duplicated lines inside each problem description information.

Figure 5:
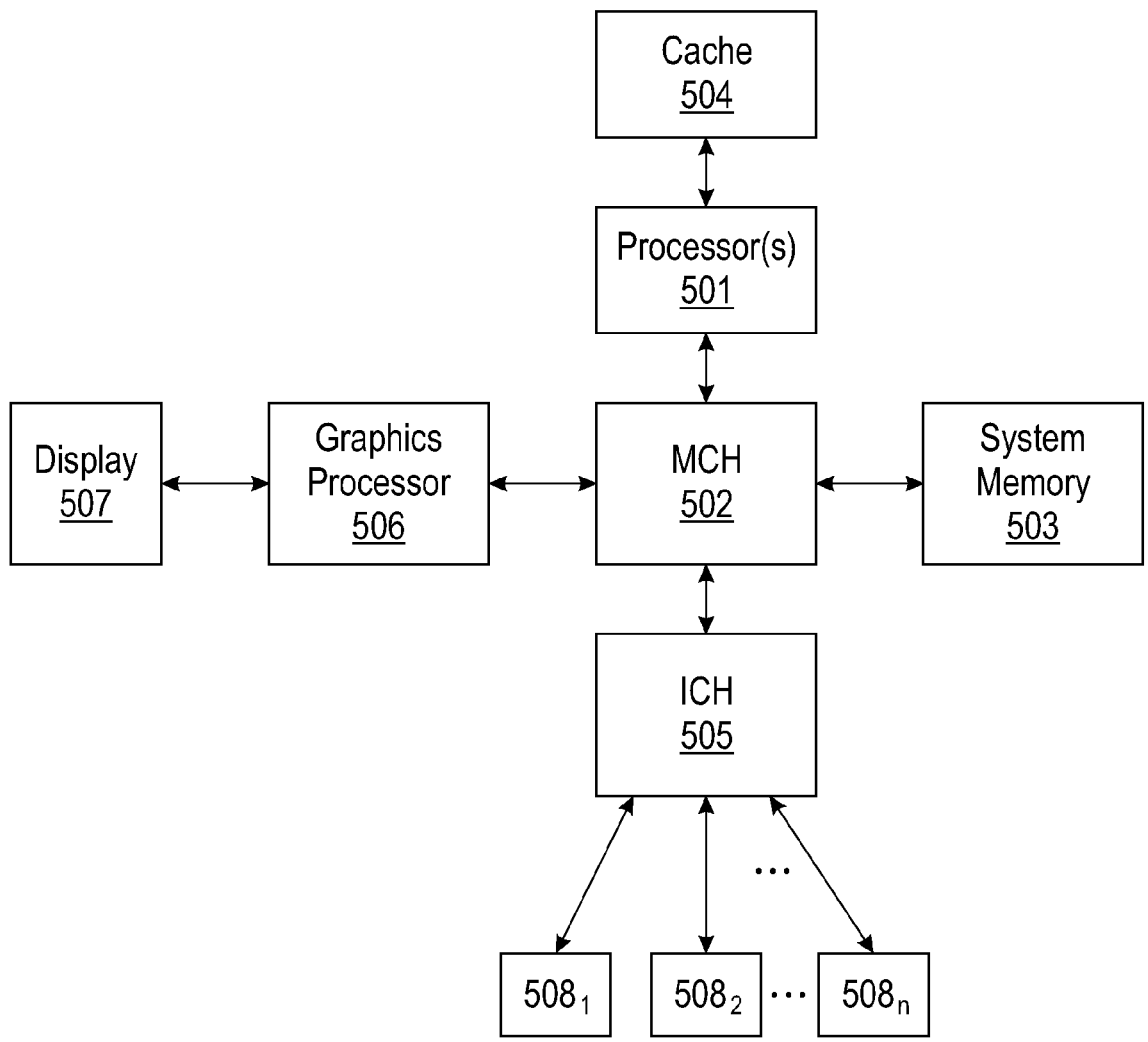
FIG. 5 illustrates a block diagram of a computer architecture in which a process for automatically diagnosing a system problem may be implemented, according to one embodiment.

FIG. 5 illustrates computer architecture 500 for implementing the systems and methods as described in FIGS. 1-9 and in the above disclosure according to one embodiment. The exemplary computing system of FIG. 5 includes: 1) one or more processors 502; 2) a memory control hub (MCH) 504; 3) a system memory 506 (of which different types exist such as DDR RAM, EDO RAM, etc,); 4) a cache 508; 5) an I/O control hub (ICH) 510; 6) a graphics processor 512; 7) a display/screen 514 (of which different types exist such as Cathode Ray Tube (CRT), Thin Film Transistor (TFT), Liquid Crystal Display (LCD), DPL, etc.); and/or 8) one or more I/O devices 516.

The one or more processors 502 execute instructions in order to perform whatever software routines the computing system implements. The instructions frequently involve some sort of operation performed upon data. Both data and instructions are stored in system memory 506 and cache 508. Cache 508 is typically designed to have shorter latency times than system memory 506. For example, cache 508 might be integrated onto the same silicon chip(s) as the processor(s) and/or constructed with faster SRAM cells whilst system memory 506 might be constructed with slower DRAM cells. By tending to store more frequently used instructions and data in the cache 508 as opposed to the system memory 506, the overall performance efficiency of the computing system improves.

System memory 506 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 506 prior to their being operated upon by the one or more processor(s) 502 in the implementation of a software program. Similarly, data that a software program determines should be sent from the computing system to an outside entity through one of the computing system interfaces, or stored into an internal storage element, is often temporarily queued in system memory 506 prior to its being transmitted or stored.

The ICH 510 is responsible for ensuring that such data is properly passed between the system memory 506 and its appropriate corresponding computing system.

One or more I/O devices 516 are also implemented in a typical computing system. I/O devices generally are responsible for transferring data to and/or from the computing system (e.g., a networking adapter); or, for large scale non-volatile storage within the computing system (e.g., hard disk drive). ICH 510 has bi-directional point-to-point links between itself and the observed I/O devices 516.

Referring back to FIG. 1, modules of the different embodiments of the described system may include software, hardware, firmware, or any combination thereof. The modules may be software programs available to the public or special or general purpose processors running proprietary or public software. The software may also be specialized programs written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium).

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 2, 4, 6-9, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented.

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A method for automatically diagnosing a system problem, comprising:

creating a problem description, wherein a problem description index is created from a group consisting of:
- a line-wise index comprising a document entry in the problem description index for each line in a problem description information of a plurality of previously diagnosed problems,
- a description-wise index comprising a document entry in the problem description index for the problem description information of each of a plurality of previously diagnosed problems, and
- a set-wise index comprising a document entry in the problem description index for each set of the problem description information of a plurality of previously diagnosed problems grouped together based on a problem cause;

receiving the problem description index and problem description information of a new problem, the problem description index comprising problem description information of previously diagnosed problems, wherein said problem description information of previously diagnosed problems and of said new problem comprises text content describing system events that have occurred;

comparing problem description information of the new problem with problem description information in the problem description index, wherein comparing the problem description information of the new problem with problem description information in the problem description index for a line-wise index comprises a line-wise search of the line-wise index, wherein said line-wise search comprises searching each line of text content in the problem description index for each line of text content from the problem description information of the new problem;

computing a search score for each document in the problem description index, wherein the search score is a measure of similarity between each document in the problem description index and the problem description information of the new problem;

assigning a matching score to each of the previously diagnosed problems based on the search score, wherein the matching score is a measure of similarity between the new problem and each of the previously diagnosed problems; and determining a diagnosis of the new problem, wherein the diagnosis of the new problem is a diagnosis of at least one of the previously diagnosed problems.

2. The method of claim 1, further comprising:
extracting problem description information of the new problem when the new problem occurs, wherein problem description information of the new problem is extracted from the group consisting of:
at least one recorded log,
at least one recorded trace, and
at least one recorded system state.

3. The method of claim 1, wherein assigning a matching score comprises processing the search score based on a similarity definition for approximation.

4. The method of claim 1, wherein assigning a matching score comprises processing the search score based on a similarity definition for noise reduction.

5. The method of claim 1, further comprising:
determining a solution to the new problem from the diagnosis based on a solution of at least one of the previously diagnosed problems.

6. The method of claim 1, further comprising:
updating the problem description index, wherein updating comprises adding the problem description information of the new problem and the diagnosis of the new problem to the problem description index.

7. The method of claim 3, wherein processing for approximation comprises normalizing a term frequency-inverse document frequency score based on a frequency of the problem description information of the new problem being included in problem description information of previously diagnosed problem sets.

8. The method of claim 3, wherein processing for approximation comprises only considering a predetermined number of documents in the problem description index with highest search scores.

9. The method of claim 3, wherein processing for approximation comprises approximating a matching score of each problem set with a predetermined number of problems in the problem description index with highest matching scores.

10. The method of claim 4, wherein processing for noise reduction comprises omitting a timestamp, a sequence number identifier, and duplicate lines from the problem description information of the previously diagnosed problems in the problem description index and the problem description information of the new problem.

11. The method of claim 4, wherein processing for noise reduction comprises normalizing a matching score between a line in the problem description information of a new problem and problem description information of each previously diagnosed problem based on a number of similar lines in problem description information of the new problem.

12. The method of claim 4, wherein processing for noise reduction comprises omitting the matching score between a line in the problem description information of a new problem and problem description information of each previously diagnosed problem when the matching score is lower than a predetermined score.

13. The method of claim 1, wherein comparing the problem description information of the new problem with problem description information in the problem description index for a description-wise index comprises a description-wise search of the description-wise index, wherein said description-wise search comprises searching the problem description index for each term of text content from the problem description information of the new problem.

14. The method of claim 1, wherein comparing the problem description information of the new problem with problem description information in the problem description index for a set-wise index comprises a description-wise search of the set-wise index, wherein said set-wise search comprises searching each set of problem description information in the problem description index for each term of text content from the problem description information of the new problem.

15. A non-transitory computer-useable storage medium for automatically diagnosing a system problem, said medium having a computer-readable program, wherein a program upon being processed on a computer causes the computer to implement the steps of:
creating a problem description index, wherein the problem description index is created from a group consisting of:
a line-wise index comprising a document entry in the problem description index for each line in a problem description information of a plurality of previously diagnosed problems,
a description-wise index comprising a document entry in the problem description index for the problem description information of each of a plurality of previously diagnosed problems, and
a set-wise index comprising a document entry in the problem description index for each set of the problem description information of a plurality of previously diagnosed problems grouped together based on a problem cause;
receiving the problem description index and problem description information of a new problem, the problem description index comprising problem description information of previously diagnosed problems, wherein said problem description information of previously diagnosed problems and of said new problem comprises text content describing system events that have occurred;
comparing problem description information of the new problem with problem description information in the problem description index, wherein comparing the problem description information of the new problem with problem description information in the problem description index for a line-wise index comprises a line-wise search of the line-wise index, wherein said line-wise search comprises searching each line of text content in the problem description index for each line of text content from the problem description information of the new problem;
computing a search score for each document in the problem description index, wherein the search score is a measure of similarity between each document in the problem description index and the problem description information of the new problem;
assigning a matching score to each of the previously diagnosed problems based on the search score, wherein the matching score is a measure of similarity between the new problem and each of the previously diagnosed problems; and
determining a diagnosis of the new problem, wherein the diagnosis of the new problem is a diagnosis of at least one of the previously diagnosed problems.

16. The computer-useable storage medium of claim 15, wherein assigning a matching score comprises processing the search score based on a similarity definition for approximation.

17. The computer-useable storage medium of claim 15, wherein assigning a matching score comprises processing the search score based on a similarity definition for noise reduction.

18. The computer-useable storage medium of claim 15, wherein comparing the problem description information of the new problem with problem description information in the problem description index for a description-wise index comprises a description-wise search of the description-wise index, wherein said description-wise search comprises searching the problem description index for each term of text content from the problem description information of the new problem.

19. The computer-useable storage medium of claim 15, wherein comparing the problem description information of the new problem with problem description information in the problem description index for a set-wise index comprises a description-wise search of the set-wise index, wherein said set-wise search comprises searching each set of problem description information in the problem description index for each term of text content from the problem description information of the new problem.

20. The computer-useable storage medium of claim 15, further comprising:
   extracting problem description information of the new problem when the new problem occurs, wherein problem description information of the new problem is extracted from the group consisting of:
      at least one recorded log,
      at least one recorded trace, and
      at least one recorded system state.

21. The computer-useable storage medium of claim 15, wherein assigning a matching score comprises processing the search score based on a similarity definition for approximation.

22. The computer-useable storage medium of claim 15, wherein assigning a matching score comprises processing the search score based on a similarity definition for noise reduction.

23. The computer-useable storage medium of claim 15, further comprising:
   determining a solution to the new problem from the diagnosis based on a solution of at least one of the previously diagnosed problems.

24. The computer-useable storage medium of claim 15, further comprising:
   updating the problem description index, wherein updating comprises adding the problem description information of the new problem and the diagnosis of the new problem to the problem description index.

25. The computer-useable storage medium of claim 21, wherein processing for approximation comprises normalizing a term frequency-inverse document frequency score based on a frequency of the problem description information of the new problem being included in problem description information of previously diagnosed problem sets.

26. The computer-useable storage medium of claim 21, wherein processing for approximation comprises only considering a predetermined number of documents in the problem description index with highest search scores.

27. The computer-useable storage medium of claim 21, wherein processing for approximation comprises approximating a matching score of each problem set with a predetermined number of problems in the problem description index with highest matching scores.

28. The computer-useable storage medium of claim 22, wherein processing for noise reduction comprises omitting a timestamp, a sequence number identifier, and duplicate lines from the problem description information of the previously diagnosed problems in the problem description index and the problem description information of the new problem.

29. The computer-useable storage medium of claim 22, wherein processing for noise reduction comprises normalizing a matching score between a line in the problem description information of a new problem and problem description information of each previously diagnosed problem based on a number of similar lines in problem description information of the new problem.

30. The computer-useable storage medium of claim 22, wherein processing for noise reduction comprises omitting the matching score between a line in the problem description information of a new problem and problem description information of each previously diagnosed problem when the matching score is lower than a predetermined score.

* * * * *